United States Patent
Loukili et al.

(10) Patent No.: US 10,188,036 B2
(45) Date of Patent: Jan. 29, 2019

(54) SYSTEM FOR EVALUATING AGRICULTURAL MATERIAL

(71) Applicants: CARNEGIE MELLON UNIVERSITY, Pittsburgh, PA (US); Deere & Company, Moline, IL (US)

(72) Inventors: Tarik Loukili, Johnston, IA (US); John M. Hageman, Bettendorf, IA (US); Zach Abraham Pazzementi, Pittsburgh, PA (US)

(73) Assignees: CARNEGIE MELLON UNIVERSITY, Pittsburgh, PA (US); DEERE & COMPANY, Moline, IL (US)

( * ) Notice: Subject to any disclaimer, the term of this patent is extended or adjusted under 35 U.S.C. 154(b) by 203 days.

(21) Appl. No.: 15/253,641

(22) Filed: Aug. 31, 2016

(65) Prior Publication Data
US 2017/0112057 A1    Apr. 27, 2017

Related U.S. Application Data

(60) Provisional application No. 62/245,615, filed on Oct. 23, 2015.

(51) Int. Cl.
*G06K 9/00* (2006.01)
*A01D 41/127* (2006.01)
(Continued)

(52) U.S. Cl.
CPC ....... *A01D 41/127* (2013.01); *A01D 41/1277* (2013.01); *G06K 9/00791* (2013.01);
(Continued)

(58) Field of Classification Search
CPC .............. A01D 41/127; A01D 41/1276; G06T 7/0028; G06T 7/408
(Continued)

(56) References Cited

U.S. PATENT DOCUMENTS

| 6,636,298 B1 | 10/2003 | Bachelder et al. |
| 7,012,382 B2 | 3/2006 | Cheang et al. |

(Continued)

FOREIGN PATENT DOCUMENTS

| EP | 1570723 A1 | 9/2005 |
| EP | 2586285 A1 | 5/2013 |

(Continued)

OTHER PUBLICATIONS

European Search Report for European Application 16194786.6 dated Mar. 17, 2017.
(Continued)

*Primary Examiner* — Van D Huynh
(74) *Attorney, Agent, or Firm* — Michael G. Monyok; David G. Oberdick

(57) ABSTRACT

Disclosed herein is a diagnostic module configured to determine an average image of a set or a sequence of collected images, to obtain a last image of the set or the sequence of collected images, and to determine a difference between the average image and the last image to yield a differenced image. Background image data or background pixels are eliminated from the differenced image to produce an initial image mask of unchanged content in the last image. A diagnostic module or data processor determines a mask area of the initial image mask or a revised image mask derived from the initial image mask. A diagnostic module or data processor generates an alert data message to inspect or clean the imaging system if the mask area exceeds a threshold area.

17 Claims, 11 Drawing Sheets

(51) Int. Cl.
  *A01D 41/06* (2006.01)
  *A01D 61/00* (2006.01)
  *A01F 12/46* (2006.01)
(52) U.S. Cl.
  CPC .............. *A01D 41/06* (2013.01); *A01D 61/00* (2013.01); *A01F 12/46* (2013.01); *G06T 2207/10024* (2013.01); *G06T 2207/30188* (2013.01)
(58) Field of Classification Search
  USPC ........................................................ 382/110
  See application file for complete search history.

(56) References Cited

U.S. PATENT DOCUMENTS

| | | | |
|---|---|---|---|
| 7,030,351 | B2 | 4/2006 | Wasserman et al. |
| 7,512,286 | B2 | 3/2009 | Luo |
| 7,668,388 | B2 | 2/2010 | Bryll |
| 7,771,262 | B2 | 8/2010 | Missotten |
| 7,859,585 | B2 | 12/2010 | Yi et al. |
| 8,045,168 | B2 | 10/2011 | Missotten et al. |
| 8,086,378 | B2 * | 12/2011 | Behnke .............. A01D 41/1277 348/120 |
| 8,218,912 | B2 | 7/2012 | Missotten et al. |
| 8,222,584 | B2 | 7/2012 | Rains, Jr. et al. |
| 8,275,516 | B2 | 9/2012 | Murphy |
| 8,494,726 | B2 | 7/2013 | Peake et al. |
| 8,565,984 | B2 | 10/2013 | Mayfield et al. |
| 8,635,840 | B2 | 1/2014 | Behnke |
| 8,831,292 | B2 * | 9/2014 | Brueckner .............. G06T 7/194 382/110 |
| 2013/0021469 | A1 | 1/2013 | Conrad et al. |
| 2014/0035752 | A1 * | 2/2014 | Johnson .................. A01G 22/00 340/601 |
| 2015/0009328 | A1 | 1/2015 | Escher et al. |
| 2016/0189007 | A1 * | 6/2016 | Wellington ............... G06T 7/12 382/110 |
| 2017/0112056 | A1 | 4/2017 | Sierra et al. |
| 2018/0000011 | A1 * | 1/2018 | Schleusner ........ A01D 41/1271 |

FOREIGN PATENT DOCUMENTS

| | | |
|---|---|---|
| EP | 2826356 A1 | 1/2015 |
| EP | 2871101 A | 5/2015 |
| JP | 2003259358 | 9/2003 |
| WO | 2006010761 A1 | 2/2006 |

OTHER PUBLICATIONS

European Search Report for European Application 16194785.8 dated Mar. 20, 2017.
Gutchess, D. et al. "A background model initialization algorithm for video surveillance." In Computer Vision, 2001. ICCV 2001. Proceedings. Eighth IEEE International Conference on, vol. 1, pp. 733-740. IEEE, 2001.I.

* cited by examiner

SYSTEM FOR EVALUATING AGRICULTURAL MATERIAL

CROSS-REFERENCE TO RELATED APPLICATIONS

This application claims the benefit under 35 U.S.C. § 119 of Provisional Ser. No. 62/245,615, filed Oct. 23, 2015, which is incorporated herein by reference.

STATEMENT REGARDING FEDERALLY SPONSORED RESEARCH

Not applicable.

BACKGROUND OF THE INVENTION

This disclosure relates to a system for evaluating agricultural material, such as an imaging system for evaluating samples of agricultural material.

Certain prior art imaging systems use cameras that are connected to a bypass channel on a clean grain elevator of a combine. The bypass channel can become clogged with agricultural material with high moisture content, or foreign materials, such as weed, plastic, packaging, branches or brush that enter into the combine or harvesting machine. Further, the lens of the camera may become obscured or affected by debris, dirt, dust or other contaminants that impacts detrimentally the accuracy of the evaluation of images of the agricultural material. In some prior art imaging systems, an operator or technician can remove clogged agricultural material or foreign matter from the bypass channel or clean the lens of the camera only by time-consuming disassembly of the imaging system from the combine with tools, such as wrenches. Accordingly, there is need for a system for evaluating agricultural material that is well suited for rapid cleaning of the bypass channel and lens of the camera, such as in real-time in the field.

BRIEF SUMMARY OF THE INVENTION

In one embodiment, a method for evaluating performance of an imaging system comprises collecting a set or a sequence of images that relate to agricultural material in a passage (e.g., in a harvesting machine or combine). A diagnostic module is configured to determine an average image of the set or the sequence of collected images, to obtain a last image of the set or the sequence of collected images, and to determine a difference between the average image and the last image to yield a differenced image. Background image data or background pixels are eliminated from the differenced image to produce an initial image mask of unchanged content in the last image. A diagnostic module or data processor determines a mask area of the initial image mask or a revised image mask derived from the initial image mask. A diagnostic module or data processor generates an alert data message to inspect or clean the imaging system if the mask area exceeds a threshold area.

DETAILED DESCRIPTION OF THE INVENTION

In accordance with one embodiment, FIG. 1 through FIG. 4, inclusive, illustrates a system 11 for evaluating agricultural material. Agricultural material means one or more of the following: grain, oil seed, fiber, maize, corn, cereal, forage material, sugar cane, soybean, wheat, oats, barley, rye or other plant material that is edible, or used for any other industrial or commercial purpose.

Figure 4:
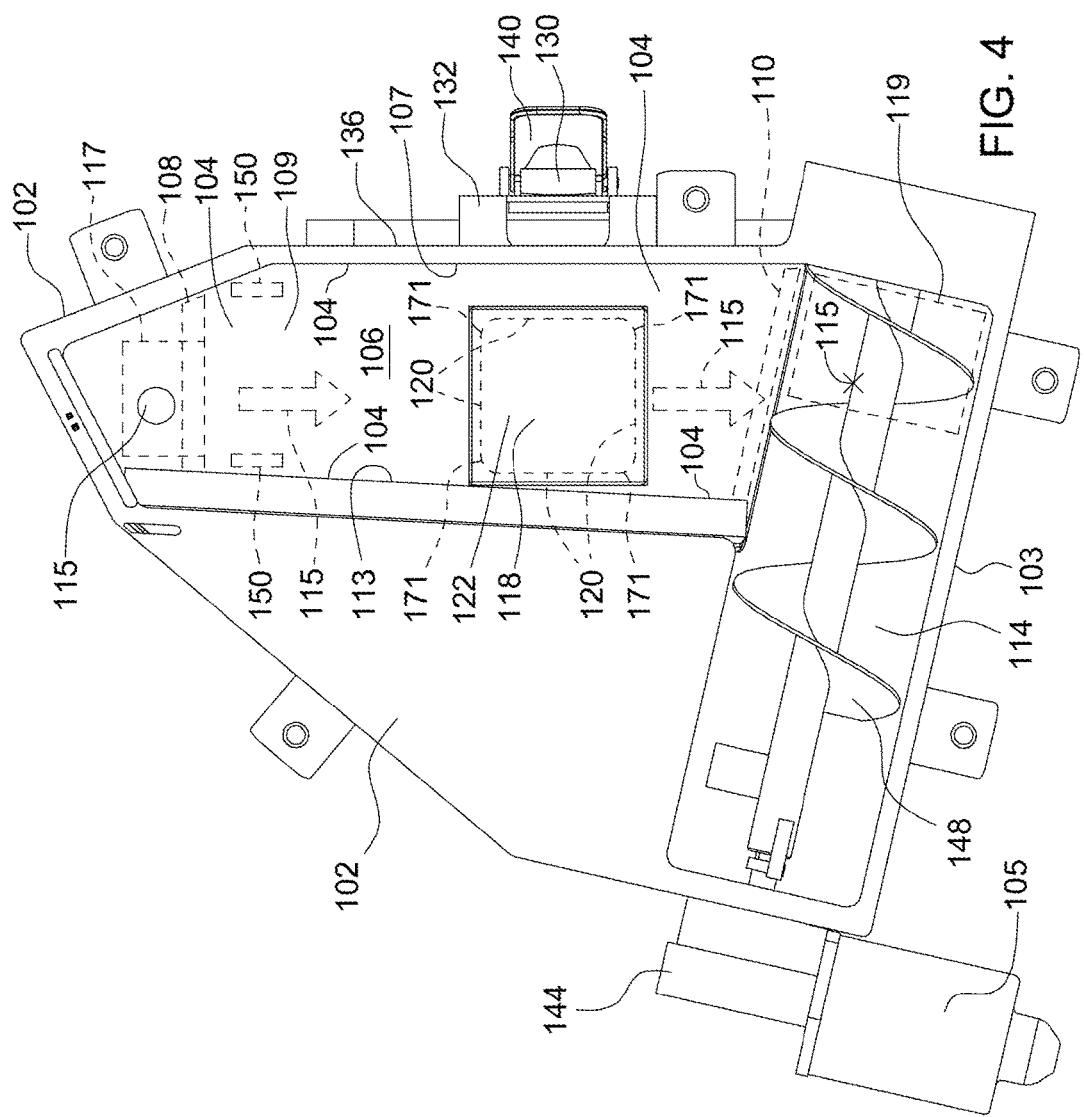
FIG. 4 is a side view of system for evaluating agricultural material where in the imaging device is positioned in the closed state and an auger is exposed.

The system 11 comprises a housing 102 having a passage 104 in or through an interior 106 of the housing 102 with an inlet 108 for receiving agricultural material and an outlet 110 for outputting the agricultural material to an auger 148 or other device for conveying agricultural material. As best illustrated in FIG. 4, the inlet 108 may lie in a plane that is substantially perpendicular to the plane of the sheet of FIG. 4; the outlet 110 may lie in a plane that is substantially perpendicular to the plane of the sheet of FIG. 4 and spaced apart from (e.g., substantially parallel to) the inlet 108. In one embodiment, the inlet 108, the outlet 110, or both occupy the full cross-sectional dimension of the passage 104.

In one embodiment, a passage 104 may comprise a channel or bypass channel that bypasses an elevator 12 (e.g., an elevator or clean grain elevator in FIG. 5) for transporting agricultural material from a container (e.g., grain bin) of the combine, harvesting machine, agricultural equipment, or heavy equipment to a chute or spout for unloading agricultural material from the container. For example, an elevator inlet of the elevator 12 is gravity fed from the container or coextensive with a bottom of the container, whereas the top or outlet of the elevator is associated with the chute or spout for unloading or transferring the agricultural material from the harvesting machine or combine. Alternately, the elevator inlet of the elevator 12 is fed by the output of desired portion of agricultural material that harvested, obtained or separated by the combine system 100.

The passage 104 is associated with a housing 102 that is attached to the elevator (e.g., clean grain elevator), a combine, a harvester or another vehicle. In one embodiment, the passage 104 may be defined by a first wall 109, a second wall 107 (e.g., an outer wall) and a third wall 113 (e.g., interior wall), and an adjacent wall (not shown), such as an elevator wall or additional wall panel of the system 11. The edge or corner 151 of the third wall 113, which intersects with the first wall 109, is shown in phantom as dashed lines in FIG. 1 and FIG. 2.

Figure 5:
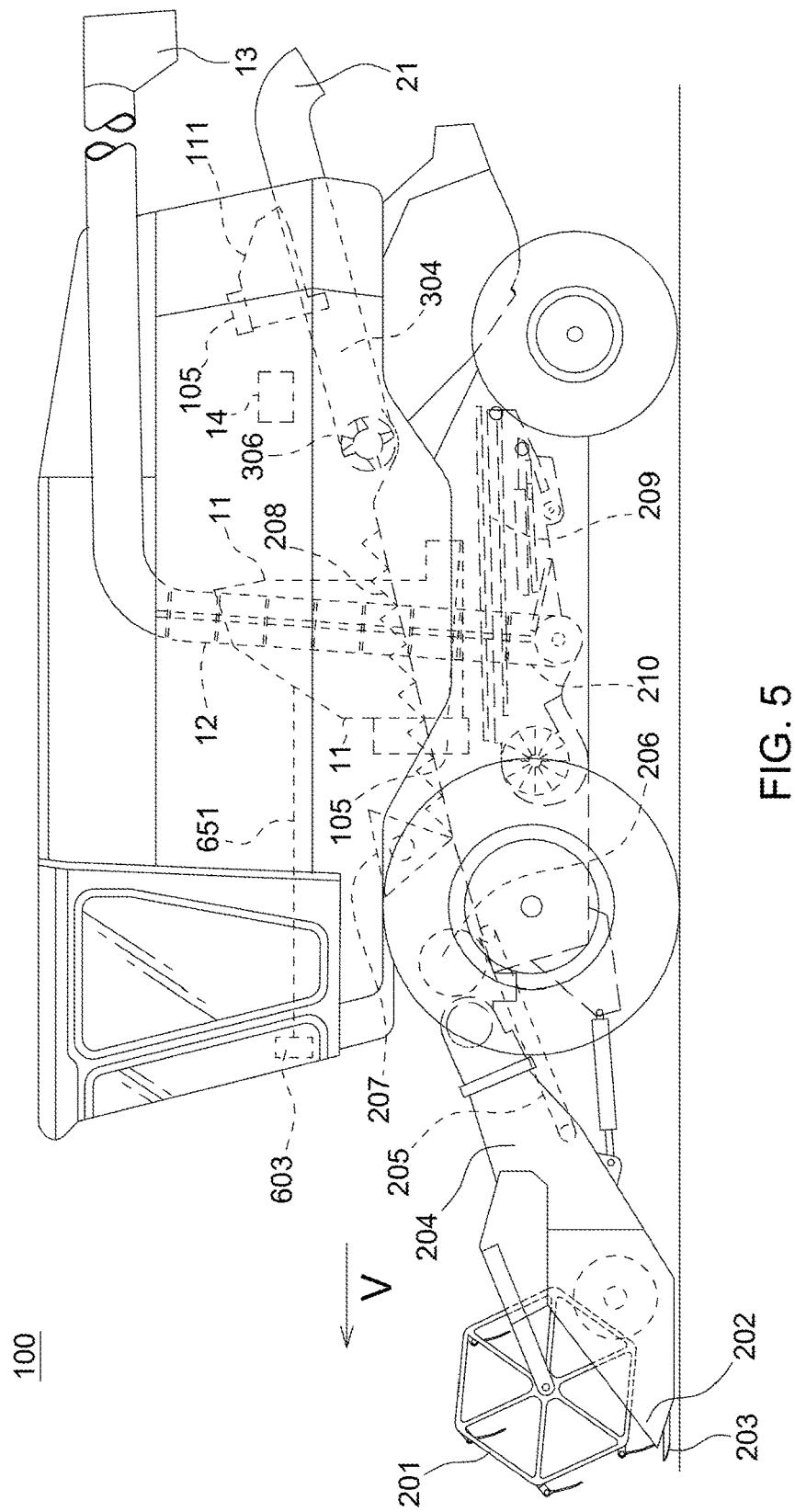
FIG. 5 is a side view of a combine or a harvesting machine with the system for evaluating agricultural material.

As shown in FIG. 4 and FIG. 5, the elevator input region 117 receives a sampled portion or diverted portion of agricultural material that is moving (e.g., upward) in the grain elevator 12, where the sampled portion of the agricultural material moves or flows (e.g., downward) through the passage 104 on a gravity fed basis to an auger that is in communication with the elevator output region 119, where the sampled portion of agricultural material enters or re-enters the elevator 12 to be conveyed (e.g., upward). In practice, the elevator input region 117 and the elevator output region 119 correspond to a first elevator opening and a second elevator opening in elevator 12, respectively. The elevator input region 117 is aligned or registered with the inlet 108 of the system 11, whereas the elevator output region 119 is aligned or registered with the outlet 110 of the system 11. In the passage 104, the direction of the flow 115 of the agricultural material is indicated by the arrows, the dot with a concentric circle, and the X symbol, through the passage 104 between the elevator input region 117 and the elevator output region 119, where the dot with the concentric circle indicates flow of agricultural material into the plane of the drawing of FIG. 4 and the X symbol indicates a flow of agricultural material outward from the plane of the drawing of FIG. 4.

In one embodiment, a wall opening 112 is in a first wall 109 of the passage 104. For example, the wall opening 112 is located in a substantially vertical first wall 109 of the passage 104.

Figure 1:
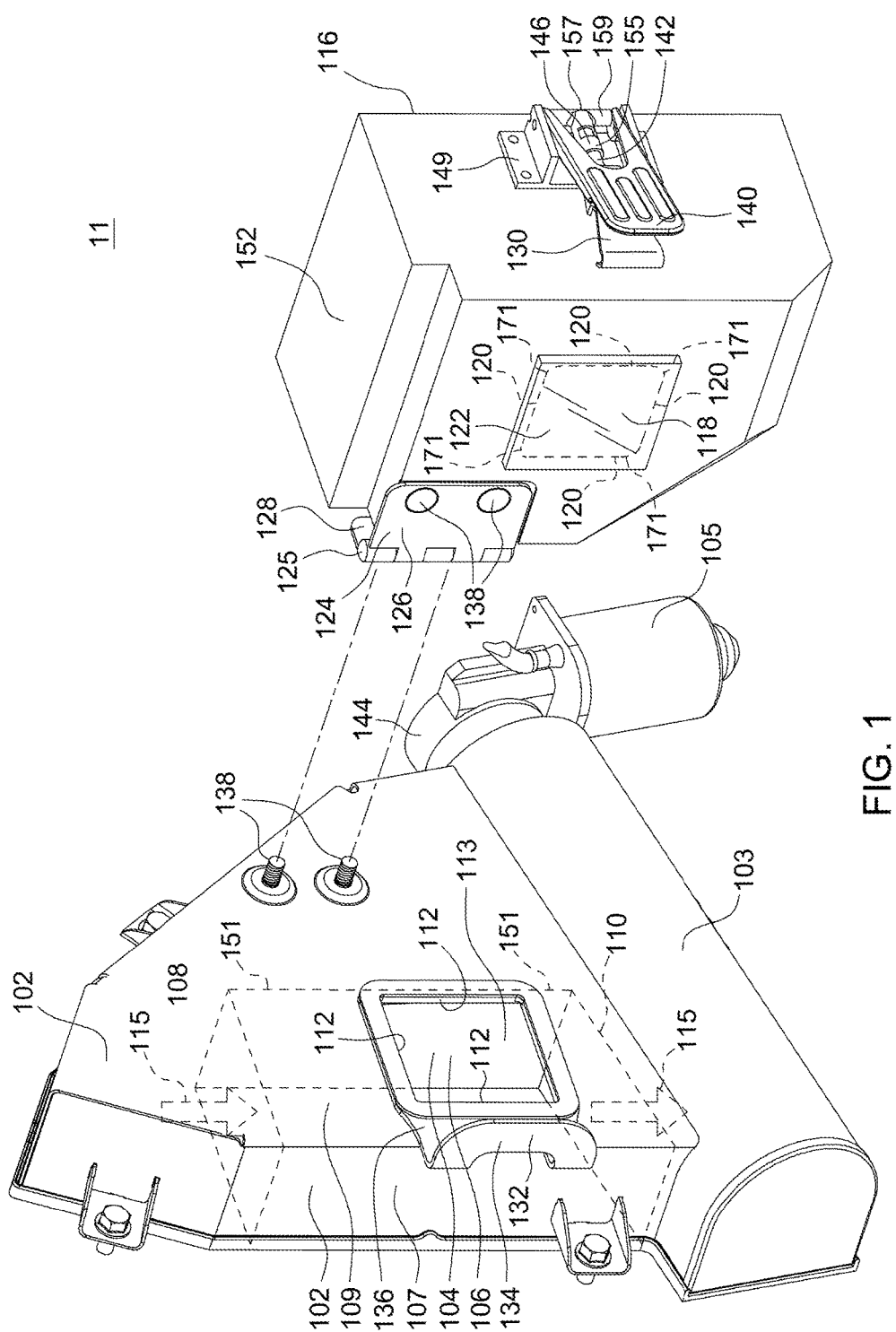
FIG. 1 is an exploded perspective view of the system for evaluating agricultural material.
Figure 2:
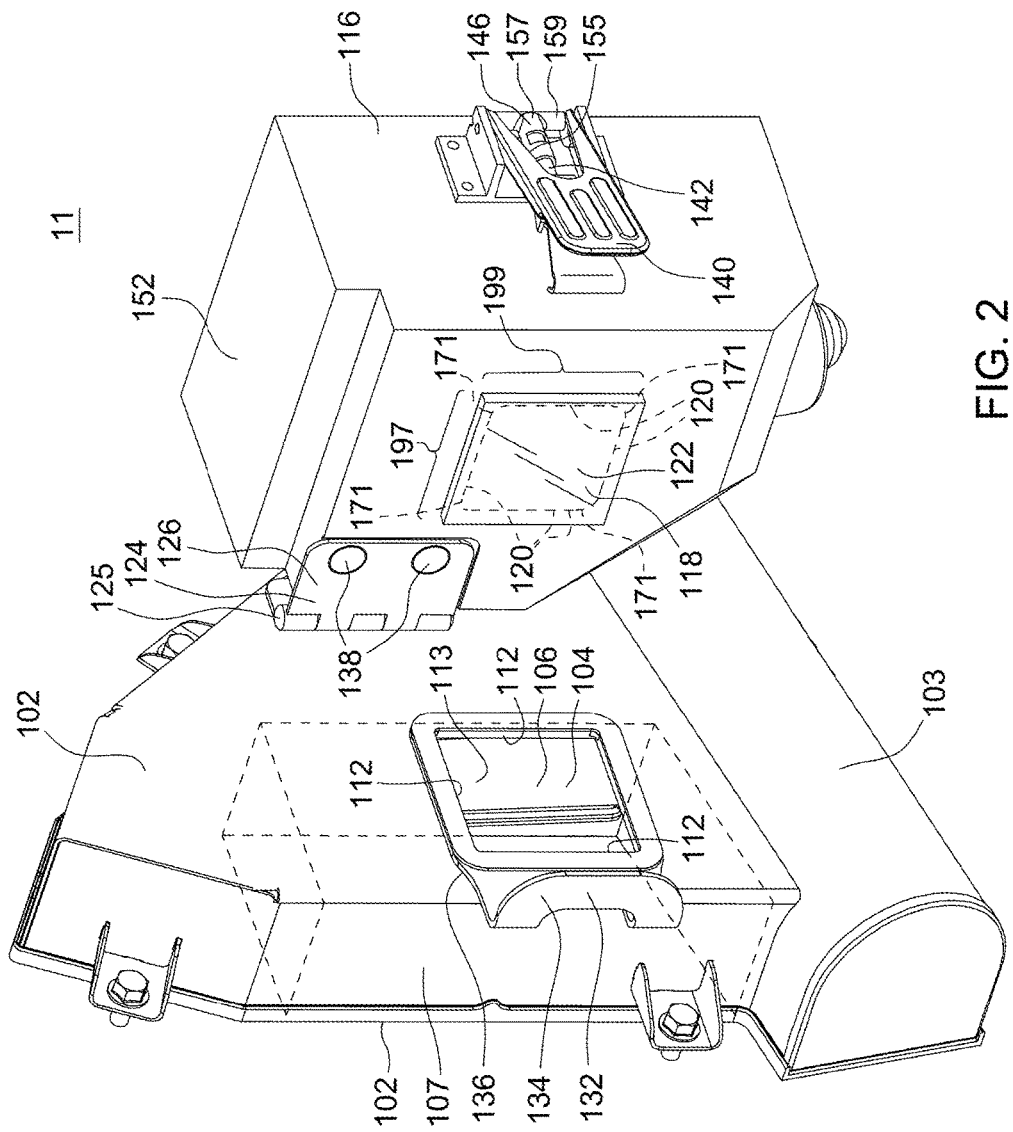
FIG. 2 is a perspective view of the system for evaluating agricultural material where the imaging device is positioned in an open state.

In one embodiment, the wall opening 112 may comprise a substantially rectangular opening, although the wall opening 112 may be substantially elliptical, circular, polygonal, or have another geometric shape. Similarly, the lens 118 (or window) and its border 120, collectively or individually, may be substantially rectangular, elliptical, circular, or polygonal, among other possibilities. As illustrated in FIG. 1, FIG. 2 and FIG. 4, the lens 118 (or window) has rounded corners 171 or tapered or chamfered edges to reduce stress on the lens 118 (or window), such as mechanical stress that can result from differential thermal coefficients of expansion in the material of the lens 118 (or window) with respect to the material (e.g., metal, alloy, polymer, plastic, or fiber-filled plastic or polymer) of the border 120 or frame. The rounded corners 171 or tapered or chamfered edges facilitate the len's or window's survival of extreme temperature fluctuations without cracking or other damage from thermal or mechanical stress. The opening size and opening shape of the wall opening 112 is generally commensurate with: (1) the size and shape of the lens 118, window or translucent plate of the imaging device 116, or (2) the size and shape of a border 120 of or around the lens 118, window or translucent plate. As referenced in this document, the lens 118 may comprise polycarbonate plastic, acrylic plastic, glass, quartz, or other structure that is substantially planar, a plate, substantially convex or rectilinear, with or without optical magnification or focusing; further, such lens 118 may comprise a secondary lens that is part of a compound lens if the secondary lens is spaced apart from a primary lens of the imaging device 116. The wall opening 112 may have a thickness, shelf, ledge, mating surface or recessed mating surface for receiving the lens 118 or translucent plate of the imaging device 116, or for receiving a frame or border 120 surrounding the lens 118 or translucent plate of the imaging device 116. In one embodiment, the frame or border 120 may protrude outward (e.g., axially, radially or both from an optical or geometric central axis of the lens) from the lens 118 or translucent plate, wherein the frame or border 120 engages, interlocks or mates with the wall opening 112, or its thickness, periphery, shelf, ledge, mating surface, or mating recess surface.

In one embodiment, an imaging device 116 comprises a camera, charged-coupled device, an image sensor (e.g., 704 in FIG. 7), a complementary metal-oxide-semiconductor (CMOS) imaging device, or another device for capturing one or more images, a sequence of images, or video of the agricultural material in the passage 104. The imaging device 116 may operate within one or more of the following light spectrum ranges or corresponding frequency ranges: visible light spectrum, near-infrared light spectrum, infra-red light spectrum and ultraviolet light spectrum. The imaging device 116 may measure transmittance, reflectance of light within one or more spectrum or frequencies to estimate attributes or characteristics of the agricultural material. Attributes or characteristics of the agricultural material may include any of the following: oil content, protein content, moisture content, yield, damaged grain, and foreign materials in the agricultural material, pesticide resistance, herbicide resistance, genetically modified attributes, or other attributes. Further, the imaging device 116 may be used in conjunction with other sensors, such as microwave moisture sensors, yield monitors, and other devices to estimate the values of or presence of attributes or parameters of the agricultural material.

In one embodiment, the imaging device 116 is housed in an enclosure 152 with a lens 118 or translucent plate that can face the passage 104 to view the moving or stationary agricultural material in the passage 104. An imaging device 116 has a lens 118 or translucent plate of the imaging device 116 located inward (e.g., radially inward) from a border 120 or frame of the imaging device 116. The imaging device 116 is pivotally mounted for rotation with respect to housing 102 such that in a closed state the border 120 (or the lens 118) engages or interlocks the wall opening 112. In an open state, which is illustrated in FIG. 2, the removal of the border 120 or lens 118 from the wall opening 112 exposes the wall opening 112 and an interior 106 of the passage 104 to facilitate rapid, convenient and accessible cleaning of debris or other material from the passage 104, without removal of the imaging device 116 from the system 11 or equipment, and without use of any tools (e.g., wrenches, screw drivers, pliers or otherwise). In the open state an operator, technician or other person can remove quickly and readily clogged agricultural material or other material that blocks, clogs or accumulates in the passage 104. In one embodiment, in the open state the lens 118 surface that faces the interior 106 of the housing 102 is exposed to facilitate rapid, convenient and accessible cleaning of debris, dirt, mud, smudges, insects, vermin, or other material from the lens 118 surface, without removal of the imaging device 116 from the system 11 or equipment, and without use of any tools (e.g., wrenches, screw drivers, pliers or otherwise). The operator, technician, or other person can quickly clean the lens 118 or translucent plate of the imaging device 116 to eliminate false or inaccurate readings or analysis of the agricultural material that might otherwise occur.

Figure 3:
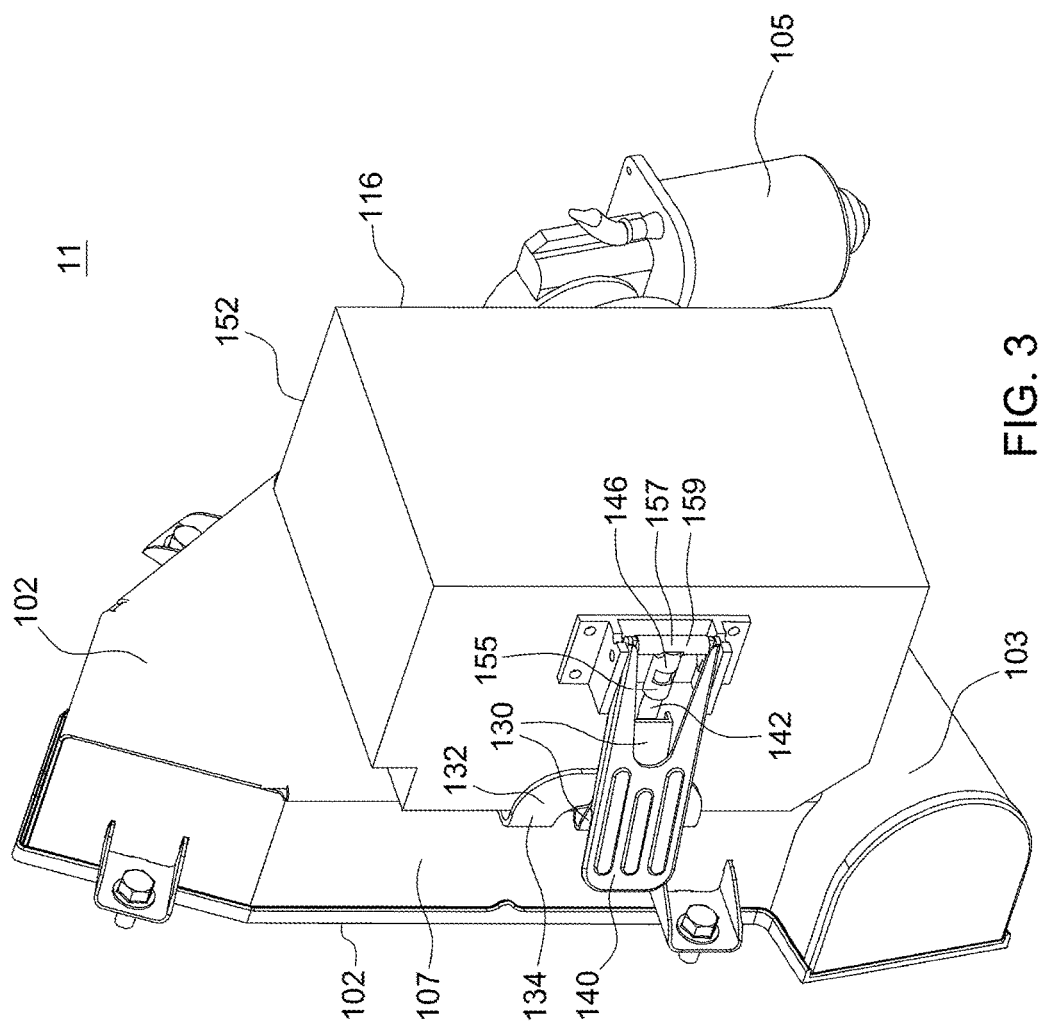
FIG. 3 is a perspective view of the system for evaluating agricultural material where the imaging device is positioned in a closed state.

FIG. 3 is a perspective view of the system for evaluating agricultural material where the imaging device 116 and its enclosure 152 are positioned in a closed state. The imaging device 116 is pivotally mounted for rotation with respect to housing 102 such that in a closed state the border 120 (or lens 118) rests on, engages or interlocks the wall opening 112. In one embodiment, the border 120 (or lens 118)

contacts the opening, a mating surface of the wall opening 112 or a recessed mating surface of the wall opening 112. For instance, border 120 or frame can be generally rectangular as shown in FIG. 2 or FIG. 3, where the border 120 protrudes (e.g., axially, radially, or both) from the imaging device 116 and is inserted into the opening in the closed state.

In one embodiment, the pivotal mounting is accomplished by a hinge 124 or hinged structure that rotates about a rotational axis or hinge pin 125. For example, the hinge 124 comprises a first hinge portion 126 and a second hinge portion 128. The first hinge portion 126 is secured to the imaging device 116 and the second portion is secured to the housing 102 via fasteners 138 or otherwise. The first hinge portion 126 and the second hinge portion 128 can rotate with respect to each other. The first hinge portion 126 and the second hinge portion 128 may have a recess (e.g., a cylindrical recess) for receiving a hinge pin 125 to support relative rotation movement of the first hinge portion 126 and the second hinge portion 128.

In one embodiment, a latch 130 engages a keeper 132 to lock the imaging device 116 or its enclosure 152 to the housing 102 in a closed state for observation of agricultural material in the passage 104. In one configuration, the keeper 132 comprises a hook 134 or bracket that extends generally orthogonally outward from an outer surface 136 of the housing 102 or the bracket. The latch 130 is coupled to or connected to a lever 140 with an optional resilient member 146, or the latch 130 may act both as a latch 130 and a resilient member, if the latch is made of a suitable material, such as spring steel. In one configuration, the lever 140 can be pivoted or rotated with respect to the latch 130 to place the latch 130 or the optional resilient member 146 under resilient tension. As illustrated, the optional resilient member 146 may comprise a coil spring that is coupled to the latch 130 at a first latch end 155 (e.g., via member 142, or a substantially cylindrical member, that is coaxially aligned with the spring) and fixed at a second latch end 157, opposite the first latch end 155, to a member 159. In one embodiment, the latch 130 is held in a locked state by an optional resilient member 146, or the resilient latch 130 itself. The latch 130 and the lever 140 are mounted to the enclosure 152 via bracket 149.

An operator, technician or other person can move the latch 130 or the lever 140 (e.g., even without any wrench, screw driver or other tools) to overcome the force of the optional resilient member 146 (or a resilient latch 130) to move from a closed state and locked state to an open state, where the lens 118 or translucent plate, or the passage 104 is exposed or accessible for quick and convenient cleaning.

In an alternate embodiment, the latch 130 can be associated with an auxiliary catch, or a pawl (e.g., spring-loaded pawl) and ratchet wheel, an auxiliary catch, or other retaining mechanism for holding the latch 130 and keeper 132 in locked state under resilient tension, wherein the lever 140 can release the pawl from the ratchet by overcoming the force of the optional resilient member 146 (or the resilient latch 130) to transition from the locked state to the open state.

The passage 104 may comprise a channel or bypass channel that bypasses an elevator 12 for transporting agricultural material. In one embodiment, the passage 104 extends from an elevator input region 117 (e.g., upper opening) in the elevator to an auger chamber 114, where the auger chamber 114 communicates with an elevator output region 119 (e.g., lower opening) in the elevator 12.

FIG. 4 is a side view of system 11 for evaluating agricultural material where in the imaging device 116 is positioned in the closed state with the latch 130 engaging the keeper 132 in a locked state and where the auger 148 is exposed by showing a cut-away view of the panel covering the auger chamber 114. As illustrated, the auger chamber 114 is substantially cylindrical, where one end is driven by the motor 105 via its shaft or a gearbox 144 and the opposite end associated with a bearing (e.g., radial bearing, axial bearing, or both). The outlet 110 is open to provide or convey the agricultural material into an elevator output region 119 (e.g., lower opening) of the elevator 12. The auger chamber 114 is defined by an auger housing portion 103. As the elevator 12 operates, the elevator 12 conveys agricultural material upward toward the chute, the elevator input region 117, and the inlet 108, which receives a sampled portion or diverted portion of the agricultural material. When the passage 104 is adequately, partially, or substantially filled, with agricultural material, the imaging device 116 may take one or more images (e.g., still images, a sequence of images, or motion picture images) of the agricultural material for evaluation of the attributes or characteristics of the agricultural material.

In one embodiment, the controller 603 may comprise a set of one or more electronic controllers or computers that can communicate with each other via a vehicle data bus (e.g., controller area network, Ethernet or another data bus) via data ports (e.g., 606); each electronic controller may comprise a data processor 604, data storage device 607, and data port 606 coupled to a data bus 605. For example, the controller 603 controls the auger 148 or its motor 105 to be in a disabled state or inactive state, based on data or signals from a fill state sensor 150, until: (1) the passage 104 is filled with agricultural material to a certain threshold level (e.g., greater than or equal to ninety-five percent of the surface area of the image, the lens 118 or the translucent plate), (2) sufficient images of the agricultural material are taken for evaluation, or (3) both. The full state of the passage 104 can be detected by an fill state sensor 150, such as a capacitive sensor, or by a fill state evaluator 608 that estimates the density or volume of agricultural material in the image or the whether the agricultural material in the image covers a minimum surface area of the field of view or the lens 118 or of the total lens surface area 122 (e.g., length 199 multiplied by width 197).

An auger 148 or conveyer is in communication with the outlet 110 and the elevator output region 119 for moving grain from the passage 104 into an elevator 12 of a combine or harvesting machine. The auger 148 or conveyer is driven, directly or indirectly, by a motor 105, such as an electric motor 105. A fill state sensor 150 (e.g., capacitive sensor) is at near a top of the passage 104 to detect the density or volume of the agricultural material to determine whether the passage 104 is filled with agricultural material. If the fill state sensor 150 or fill state evaluator 608 sends a data message or signal indicative of a full state or sufficiently full state, the controller 603 (e.g., or set of one or more controllers) or data processor 604 can trigger the imaging device 116 to take images of the agricultural material through the lens 118, window or translucent plate and, after the images are collected for a sampled portion of the agricultural material, to activate the auger 148 (or auger motor 105) to transfer or release material from the passage 104 to an elevator of a combine or harvesting machine (e.g., to prepare the passage 104 for a next filling and next image collection by the imaging device 116).

In an alternate embodiment, the fill state sensor 150 or fill state evaluator 608 may be omitted from the system and the data processor 604 can trigger at regular intervals (e.g., periodically) the imaging device 116 to take images of agricultural material, while the motor 105 for the auger 148 is controlled (e.g., activated at regular intervals) by a set of controllers 603 without data input from the fill state sensor 150 or the fill state evaluator 608.

In one configuration, the imaging device 116 collects images of the agricultural material in the passage 104 if the imaging device 116 determines that the field of view associated with the lens 118 is filled with agricultural material above a certain threshold density level. The threshold density level is approximately ninety-five percent (95%) of the image area is occupied with agricultural material, in one embodiment.

The imaging device 116 collects images of the agricultural material in the passage 104 to evaluate an attribute of the agricultural material, where an attribute is selected from the group comprising moisture, broken kernels, damaged kernels, protein content, oil content or foreign matter contamination, among other things.

FIG. 5 illustrates a combine system 100 or harvesting system for harvesting grain from a field. In one embodiment, the combine system 100 can comprise a revolving reel 201 for pushing the agricultural material (e.g., grain crop) planted in the field towards a cutter bar 203, where the cutter bar 203 comprises a plurality of teeth configured to cut off the agricultural material at or near their base. The combine system 100 further comprises a header divider 202 for defining a row of crop or material that will be harvested by the combine system 100, a feeder 204 configured to accept the agricultural material after it has been cut by the cutter bar 203, a conveyor 205 configured to transport the agricultural material from the feeder 204 to an internal chamber of the combine system 100, a threshing drum 206 configured to beat/thresh the agricultural material traveling on or provided by the conveyor 205 to break, shake or separate a desired portion (e.g., seeds, fiber or grain) of the agricultural material from an undesired portion of the agricultural material (e.g., a stalk portion or straw chaff), a beater 207 configured to further separate (e.g., beat/thresh) the agricultural material traveling on or provided the conveyor 205 into a desired portion (e.g. concentrated desired portion) and an undesired portion. In one embodiment, an optional shaking screen 208 is configured to separate the desired portion from the undesired portion and is disposed of out of a rear outlet 21 for the undesired portion of the agricultural material, while the desired portion of the agricultural material is able to fall down towards the sieve 209 (e.g., grain sieve). The sieve 209 further separates the desired portion (e.g., grain) of the agricultural material from any remaining undesired portion (e.g., straw chaff portions). After falling through the sieve 209, the desired portion (e.g., grain, oilseed, or fiber) of the agricultural material is collected in a container 210 (e.g., holding tank). Grain collected in the container 210 can be may be transferred to a storage container (e.g., grain wagon) traveling alongside the combine system 100, where the storage container may be arranged to hold a larger amount of grain than the container 210 within the combine system 100.

As the undesired portion of the agricultural material is collected toward the top of the of the sieve 209, a fan 306 or rear conveyer moves, propels or forces the undesired portion of the agricultural material (e.g., trailings) into passage 304 for exit at the rear outlet 21, or prior to exit sampling by the optional imaging system 111. The passage 304 has an inlet (opening) and an outlet (opening) for the agricultural material to be sampled or analyzed by the optional imaging system 111. In one embodiment, the optional imaging system 111 is analogous to imaging system 11 and may include the same or similar components as imaging system 11 described in this document. The optional imaging system 111 is indicated as optional by the dashed lines in FIG. 5. The optional imaging system 111 receives the undesired portion of agricultural material and takes collected images for analysis by the controller 603 or another electronic controller. The imaging system 111 may be connected to the controller 603 or another electronic controller via a transmission line 651 or data bus. The controller 603 can process images of the undesired portion of the agricultural material to provide data on or more characteristics of the undesired portion of the agricultural material, such as moisture, volume, or other parameters.

Combine system 100 also includes an engine compartment 14 configured to house one or more engines and engine components for powering the various drives and motors within the combine system 100. The combine system 100 may include fewer, or additional, components than specifically illustrated in FIG. 5 and still be able to achieve the features described herein.

In one embodiment, the elevator 12 comprises an auger that rotates to move agricultural material upward in the elevator 12 and outward toward a discharge end 13 of the chute. In another embodiment, a series of carriers or paddles are movably attached to an elevator drive (e.g., elevator chain) to convey agricultural material upward in the elevator and outward toward a discharge end of the chute.

In one configuration, the imaging device 116 may comprise a video recorder configured to record agricultural material that enter into the passage 104 or a sampling receptacle so that the recording may be analyzed by a video processing unit comprised of a data processor 604, a data storage device 607 (e.g., memory), and video processing software (608, 609, 610) stored on the memory and executed by the data processor 604. The analysis of the recording may identify physical characteristics of grain that enter into the sampling receptacle such as damage to the agricultural material (e.g., broken kernels or damaged kernels).

Figure 6:
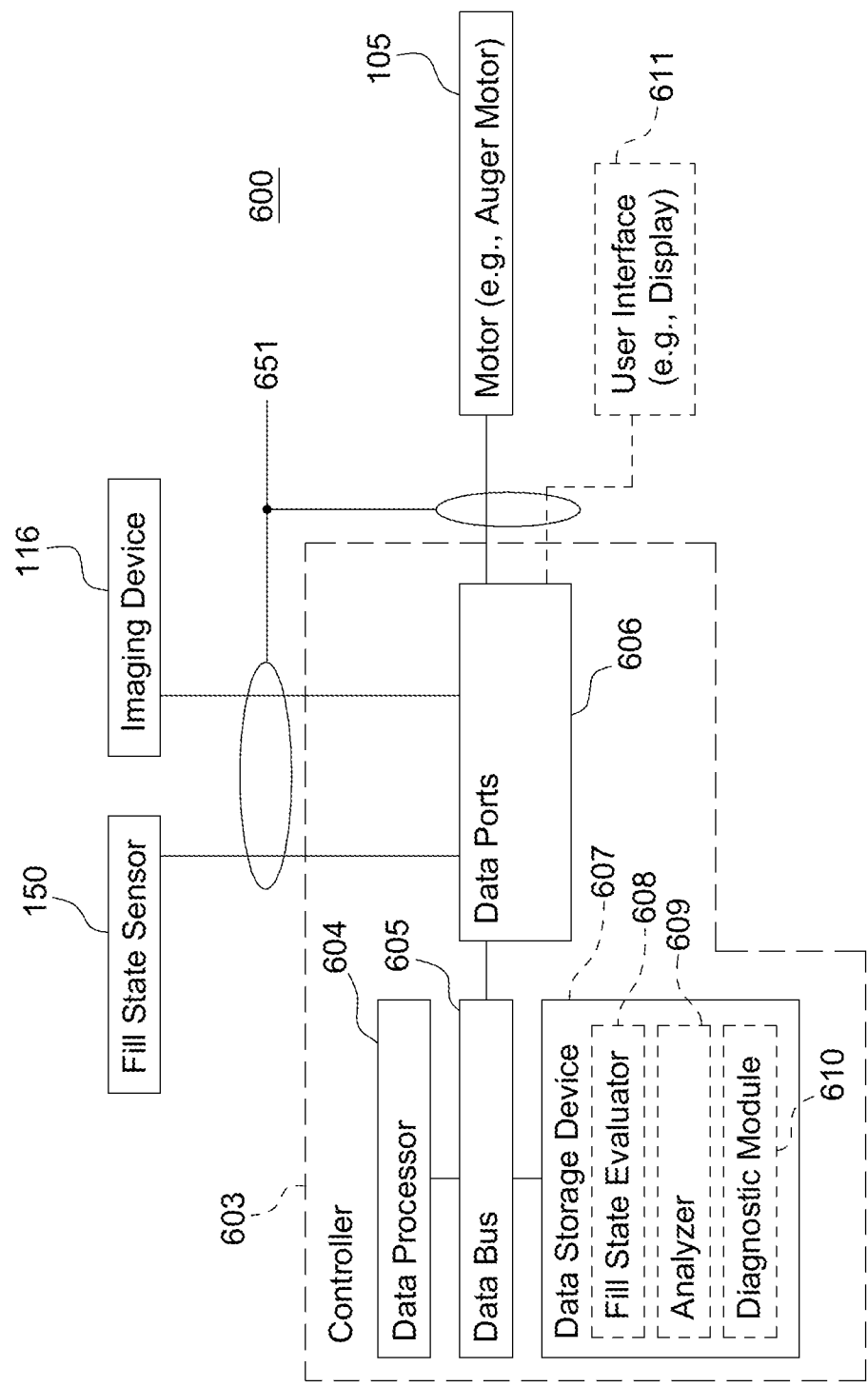
FIG. 6 is a block diagram of the electrical components of the system.

FIG. 6 is a block diagram of the electrical components of the system. A fill state sensor 150 and an imaging device 116 are coupled to a controller 603 via one or more transmission lines 651 (e.g., data bus, wires, cable, or optical fiber). Similarly, the motor 105 (e.g., auger motor) is coupled to the controller 603 via one or more transmission lines 651. In one embodiment, the controller 603 comprises an electronic data processor 604, one or more data ports 606, and a data storage device 607 that is coupled to or communicates via a data bus 605. An optional user interface 611 (e.g., display) may be coupled to the controller 603 via one or more data ports 606. The optional nature of the optional user interface 611 is indicated by the dashed lines and may be deleted from certain configurations.

In one embodiment, the electronic data processor 604 comprises a microprocessor, a microcontroller, an application specific integrated circuit (ASIC), a digital signal processor, a programmable logic array, or another device for processing or manipulating data. The data storage device 607 may comprise electronic memory, non-volatile random access memory, an optical storage device, a magnetic storage device, a hard disk, or any other device for storing data. The user interface 611 may comprise one or more of the following: a display (e.g., touch-screen display), a keypad, a keyboard, a pointing device (e.g., electronic mouse), or a portable computer.

In one illustrative configuration, the data storage device 607 may store one or more of the following software modules for execution by the data processor 604: fill state evaluator 608, analyzer 609, and diagnostic module 610 (e.g., clean alert message generator). Each of the above software modules may comprise executable software instructions, libraries, data or other data structures for processing by the data processor 604.

In one example, a fill state sensor 150 is coupled to a controller 603, or a data port 606 of the controller 603 to provide fill state data on the fill state of passage 104 for triggering of image capture or collection by the imaging device 116. The controller 603 may receive images or image data from the imaging device 116 for processing or analysis via the data port 606. The controller 603 may send command data to the imaging device 116 to begin collection of one or more images or to cease collection of images based on data from the fill state sensor 150, fill state evaluator 608, analyzer 609, or the diagnostic module 610 (e.g., clean alert message generator). In certain configurations, the analyzer 609 may provide data about the characteristic or attributes of the agricultural material (e.g. harvested agricultural material) to an operator of the combine system 100 or harvesting machine via a user interface 611 (e.g., display). The diagnostic module 610 may provide a clean alert message to the operator via the user interface 611 to warn or alter the operator to clean the passage 104, the lens 118, or both to improve performance or accuracy of the images of the image device 116, and associated analysis of attributes and characteristics by the analyzer 609.

Figure 7:
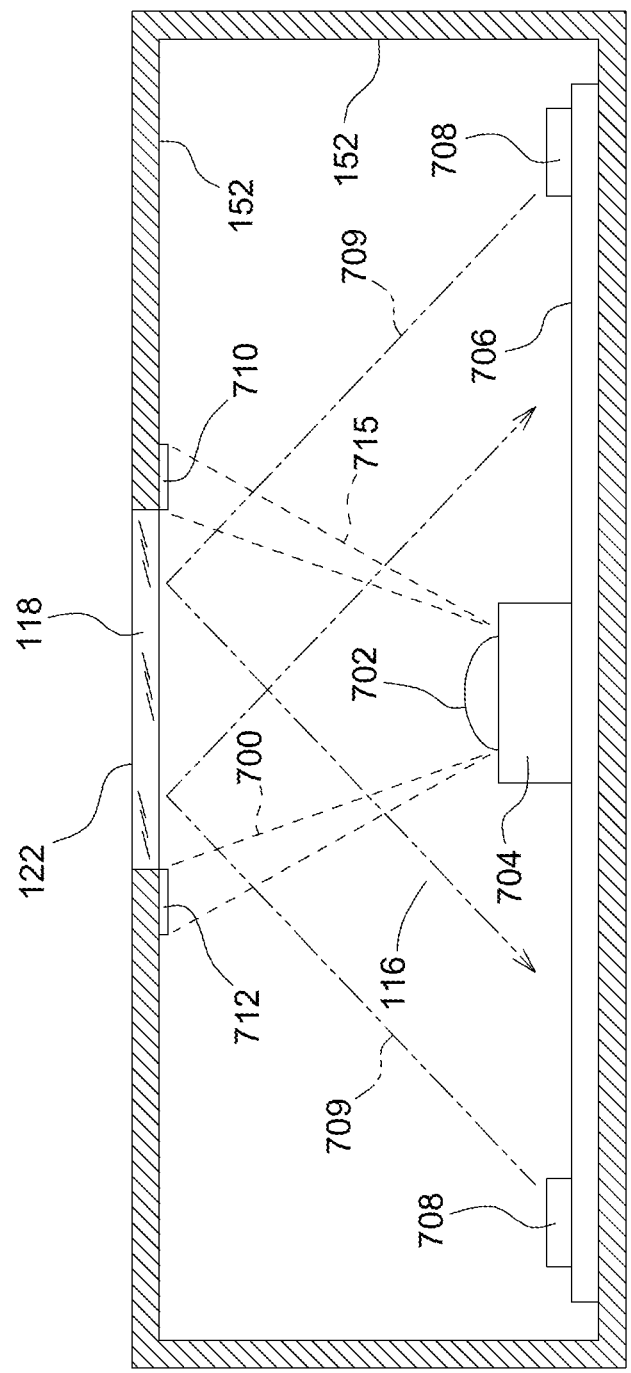
FIG. 7 is a plan view of the imaging system with a top of the enclosure removed or cut away to reveal an interior of the enclosure.

FIG. 7 shows a top view of the imaging device 116 or camera with the top of the enclosure 152 removed or cut away to reveal an interior of the enclosure 152. In one embodiment, the imaging device 116 comprises a charge-coupled device or other image sensor 704 for collecting image data related to the agricultural material in the passage 104. The image sensor 704 of the imaging device 116 faces the lens 118 or window to collect image data of agricultural material in the passage 104. The image sensor 704 can detect image data within a first field of view 700 or a second field of view 715 through one or more lenses (e.g., primary lens 702, and a (secondary) lens 118 or window) or a compound lens arrangement. As illustrated in FIG. 7, the image sensor 704 and associated primary lens 702 are mounted on a circuit board 706. Further, one or more light sources 708, such as light-emitting diodes may be mounted on or adjacent to the circuit board 706 for illuminating the agricultural material in the passage 104. The light sources 708 may comprise light sources that output one or more of the following electromagnetic radiation: visible light (e.g., white, red, blue, or green frequency bands), ultraviolet light, infra-red light, and near infra-red light.

As shown by the illustrative representation of the light path 709 from the light source 708, the light path 709 or the light sources 708 illuminate the lens 118 (or window) with reduced glare because the (direct) reflections of the light path 709 from the lens 118 (or window) to do not directly impinge on or strike the primary lens 702 or the image sensor 704. The direct (specular) reflection of the light path 709 from the lens 118 (or window) excludes the region or sensing surface of the image sensor 704. Instead, the light source 708 indirectly illuminates the sensing surface of the image sensor 704 to reduce glare (e.g., and to compensate for optical attenuation from minor imperfections or scratches in the lens 118 (or window)) in the collected images from the image sensor 104 or imaging device 116 without complex optics or arrangement of the light source 708. The lens 118 (or window) is illuminated from radiation emitted from the light sources 708 and direct reflections of the radiation do not impinge upon the image sensor 704 to reduce glare or glare-related distortion (e.g. artifacts, such as undesired reflections of portions of the interior of the imaging device 116 or discolored lighter regions of pixels) in the collected image data. As illustrated in FIG. 7, the light sources 708 are spaced apart on each side of the image sensor 704 and may be mounted on a same or common circuit board 706 or substrate as the image sensor 704. Further, in some embodiments, the light sources 708 may be substantially co-planar with respect to the image sensor 704 or its lens 702. For example, substantially co-planar means that the light sources 708 and the image sensor 704 are aligned, or the light sources 708 and the lens 702 are aligned such that a plane or an axis can simultaneously intercept their packages, or any of their outer surfaces. The first field of view 700 of the image sensor 704 is selected to include substantially an entire surface area 122 of the lens 118 or window, whereas the second field of view 715 of the image sensor 704 extends beyond the surface area (e.g., 122) of the lens 118 or window to include reference image data (710, 712).

In one embodiment, the reference image data comprises reference color pattern 710 or chart, a reference gray-scale pattern 712 or chart, or both. For example, the image sensor 704 or its associated controller 603 or data processor 604 can crop the image or change the field of view (e.g., between a first field of view 700 and a second field of view 715) or focus via an optional adjustable lens to change the field of view. During a diagnostic mode, the imaging device 116 can capture the second field of view 715 such that the controller 603 or data processor 604 can refer to the reference color pattern 710, the reference gray-scale pattern 712, and collected image data in one or more images to determine an operational or diagnostic status of the imaging device 116, or its components, such as failure of one or more light sources 708 with a known frequency versus radiation intensity output. During an operational mode that is separate from the diagnostic mode, the imaging device 116 can capture one or more images in the first field of view 700 such that the controller 603 or data processor 604 for processing to determine the characteristics or volume of the agricultural material, for example.

Figure 8:
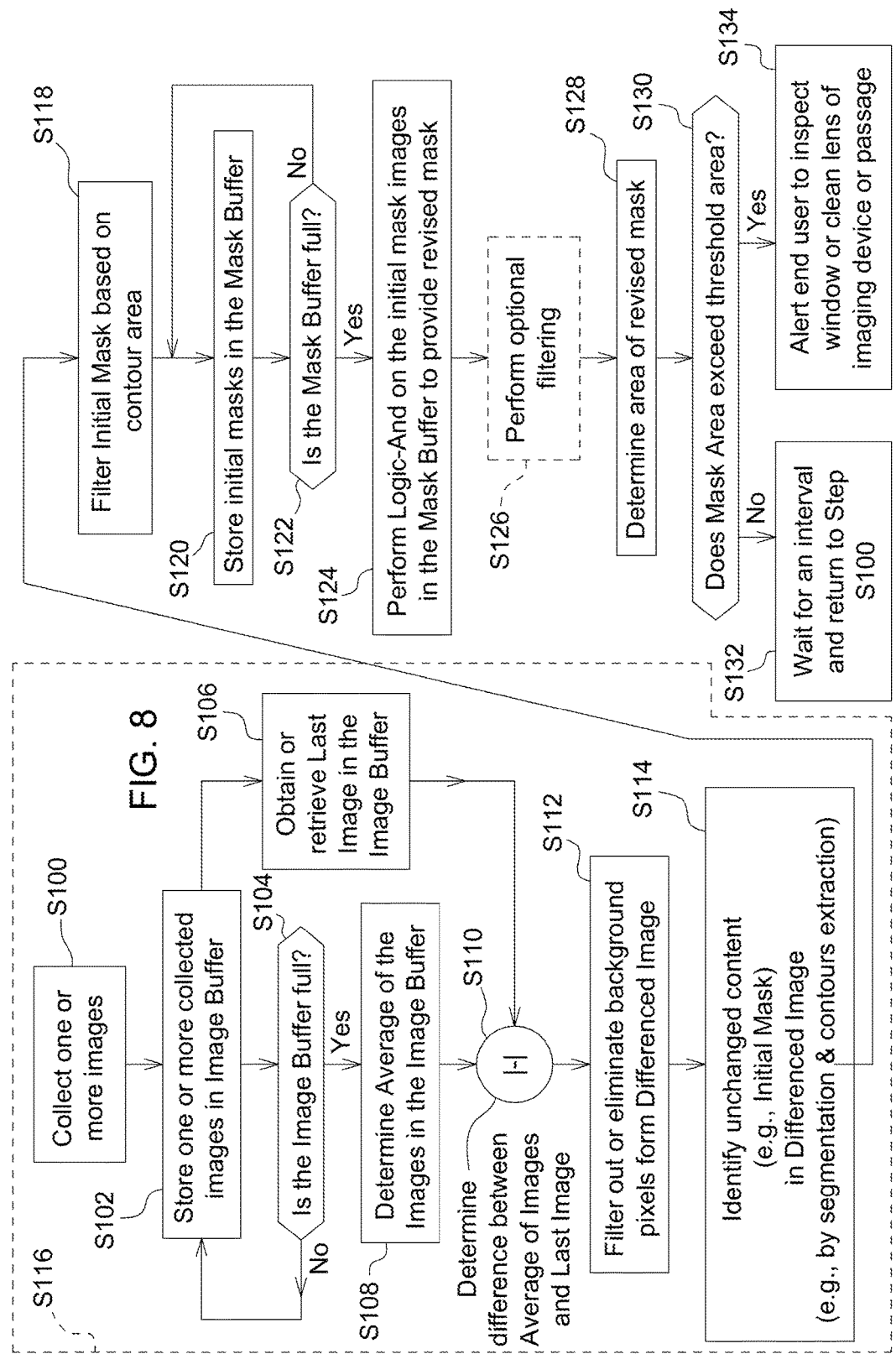
FIG. 8 is a flow chart of one embodiment of a method for evaluating performance of an imaging system.

In FIG. 8, the diagnostic module 610 or data processor 604 analyzes the agricultural material to determine the amount of material that is obscuring or blocking a lens 118 or window of the imaging device 116, or obstructing a passage 104 that is observed via the lens 118 or window. As the agricultural material passes through the passage 104 and by the lens 118 or window, the imaging system 11 collects a sequence or set of images for analysis by the diagnostic module 610, data processor 604 or both. The imaging system 11 identifies unchanged areas of the image over a period of time (e.g., sampling interval that fills a buffer memory of adjustable or selected size). The imaging system 11, controller 603, data processor 604 or diagnostic module 610 masks the image data for form masked image data (e.g., initial mask or revised mask) to avoid the diagnostic module 610 attempting to analyze or classify the unchanged areas of the image, which tend to indicate the presence of particular material adhering to the lens 118 or window or obscuring a direct view of the agricultural material beyond the particular material. For instance, the mask may refer to one or more regions of the image that is digitally filtered, disregarded, rejected or ignored in certain subsequent processing by the data processor 604 or controller 603 of unchanged areas of the image that can represent stationary material lodged in the passage 104 or stuck to the lens 118 or window. The size or area of the mask or masked image data relative to the entire image will be monitored (e.g., continuously, regularly or periodically) to determine when to trigger an alert data message or other warning to the operator via the user interface 611. For example, the alert data message may indicate that the camera window requires inspection or cleaning, or is getting dirty. In an alternate embodiment, the alert data message may indicate whether the imaging system 11 can still perform reliably. The method of FIG. 8 begins in step S100.

In step S100 of FIG. 8, the imaging system 11 collects one or more images of the agricultural material in the passage 104 via the wall opening 112. Step S100 may be carried out in accordance with various techniques, which may be applied alternately or cumulatively. Under a first technique, the imaging system 11 collects one or more images of the agricultural material in the passage 104 if the fill level sensor 150 indicates that the fill level has reached a full state or a fill level above a certain threshold. Under a second technique, the imaging system 11 collects one or more images of the agricultural material in the passage 104 if a motion sensor or yield monitor indicates that the agricultural material is flowing through the combine or its elevator. Under a third technique, the imaging system 11 collects a sequence of images of the agricultural material in the passage 104 over a time period.

In step S102, the imaging system 11, controller 603 or data processor 604 stores one or more images (e.g., a sequence of images) of the agricultural material in the passage 104 in a data storage device 607, such as buffer memory.

In step S104, the imaging system 11, controller 603 or data processor 604 determines whether an allocated data storage of the data storage device 607, such as buffer memory, is full. If the allocated data storage of the data storage device 607 or the buffer memory is full, the method continues with step S108. However, if the buffer memory or the allocated data storage of the data storage device 607 is not full, the method continues with step S102 for another iteration of storing collected images from the imaging system 11.

Step S108 may follow step S104 if the buffer memory or allocated data storage of the data storage is full. In step S108, the data processor 604, controller 603 or diagnostic module 610 determines an average image or the average pixel value of each pixel in the stored images in the buffer memory or the allocated data storage. Step S108 may be accomplished by various techniques that may be applied alternately or cumulatively. Under a first technique, the average pixel value may comprise a mean, mode, median, or other statistical average of the colors of the pixel in color space (e.g., RGB color space or red-green-blue color space), the intensity level of the pixel, or both. Under a second technique, the data processor 604, controller 603 or diagnostic module 610 determines an average image that comprises a mean, median or mode of corresponding pixels in the same respective positions in successive collected images (of the set or sequence) to facilitate identification of unchanged content or stationary content in one or more images.

In step S106, the data processor 604, controller 603 or diagnostic module 610 obtains, retrieves or reads the last image in the buffer memory or the allocated data storage, among the stored images that were collected.

In step S110, the data processor 604, controller 603 or diagnostic module 610 determines a difference between respective average pixel values (e.g., average color space values, average intensity values, or both) in an average image representation created in step S108 and corresponding last pixel values (e.g., observed color space values, observed intensity values or both) of the last image in the buffer memory or allocated data storage extracted or obtained in step S106. For example, in step S110, the difference or absolute value difference is taken between pixels in same or substantially the same positions (e.g., matrix locations, or pixel row identifier and pixel column identifier) in each image. The difference between the respective average pixel values and the corresponding last pixel values provides an indication of candidate pixels that are unchanged pixels or stationary pixels. However, the candidate pixels may still contain background pixels from the interior 106 surface of the passage 104.

In step S112, the data processor 604, controller 603 or diagnostic module 610 uses color differentiation to eliminate background pixels from the candidate pixels. For example, the data processor 604, controller 603 or diagnostic module 610 uses a threshold process to eliminate pixels that fall within a certain color range consistent with the background or interior 106 surfaces of the passage 104 (e.g., for conveying the agricultural material that is observed by the imaging system 11). For example, if the background pixels are a known color or hue (e.g., red, blue, yellow, black, white) distinct from the color of the agricultural material, the background pixels can be separated from the remaining pixels to yield pixels associated (e.g., primarily associated) with the agricultural material, and perhaps any present contaminants that do not match the background pixels. The background pixels can be associated with paint, dye or coloring of the interior 106 walls of the passage 104, particularly the portion of the wall within the field of view of the camera.

In step S114, the data processor 604, controller 603 or diagnostic module 610 identifies regions of the last image with unchanged content based on the determined difference of step S110 and the elimination of background pixels in step S112. In other words, the data processor 604, controller 603 or diagnostics module identifies the unchanged content or stationary content by determining of the average image and eliminating background image data; the unchanged content or stationary content is indicative of agricultural material or foreign material that is stuck to a window or lens 118 of the imaging system 11, or foreign material or agricultural material that is blocking or clogging a passage 104 in a harvesting machine 100 associated with the imaging system 11. For example, the data processor 604, controller 603 or diagnostic module 610 segments the last image and extracts contours of the regions with unchanged content based on the determined difference of step S110 and the elimination of background pixels in step S112 to define an initial mask of the unchanged content.

Steps S100 through steps S114, inclusive, may be collectively defined as step S116, which represents an initial mask process.

In step S118, following the initial mask process, the data processor 604, controller 603 or diagnostic module 610 performs temporal and spatial filtering of the contour areas or the initial mask to reduce or eliminate noise in the image.

For example, the temporal and spatial filtering provides more definite or crisp boundaries of the contour areas of the initial mask.

In step S120, the data processor 604, the controller 603 or the diagnostic module 610 stores a group of initial masks in the mask buffer or other allocated data storage of the data storage device 607 from one or more successive iterations of the initial mask process S116.

In step S122, the data processor 604, the controller 603 or the diagnostic module 610 determines whether the buffer memory or allocated data storage of the data storage device 607 is full. If the buffer memory or allocated data storage is not full, then the method returns to step S120. However, if the buffer memory or the allocated data storage is full, then the method continues with step S124.

In step S124, the data processor 604, the controller 603 or the diagnostic module 610 performs a logical operation (e.g., a Boolean logic-AND operation or its equivalent) on the initial mask images in the buffer memory or allocated data storage to provide a revised mask.

In step S126, the data processor 604, the controller 603 or the diagnostic module 610 performs optional filtering, such as temporal filtering, spatial filtering or both. The optional nature of the filtering is indicated by the dashed lines for the block of step S126.

In step S128, the data processor 604, the controller 603 or the diagnostic module 610 determines a mask area or total mask area of the revised mask. For example, the total mask area can be determined by integrating (e.g., determining double integrals of) the pixels, or the contour boundaries for groups of pixels, in the logic-processed last image (e.g., AND-processed last image) that are unchanged or stationary.

In step S130, the data processor 604, the controller 603 or the diagnostic module 610 determines whether the revised mask area exceeds a threshold area or one or more threshold areas. Each one of the threshold areas is based on a fraction or percentage of the total area of the image that is sufficient or adequate for the analyzer 609 to analyze the agricultural material in the image to estimate reliably one or more characteristics or attributes of the agricultural material, without material or significant error in the estimation of the characteristics or attributes. In one example, the threshold area may vary depending upon the attribute or characteristic of the agricultural material that is measured or estimated, such that each attribute or characteristic that is actively measured by the system is subject to a corresponding attribute-specific threshold area that is distinct and separate from other threshold areas. If the revised mask area exceeds the threshold area or the attribute-specific threshold area, the method continues with step S134, in which the user is alerted to inspect or clean the window or lens 118 of the imaging device 116. However, if the revised mask area does not exceed the threshold area or the attribute-specific threshold area, the method continues with step S132, in which the process repeats starting with step S100 for a subsequent sampling interval.

In an alternate embodiment, the data processor 604, the controller 603, or the diagnostic module 610 determines whether the revised mask area is less than or equal to, or greater than, a first threshold area, a second threshold area, or a third threshold area, where the first threshold area is a lower threshold area (e.g., of a total surface area of the lens 118 or window), where the second threshold area is an intermediate or medium threshold area (e.g., of a total surface area of the lens 118 or window), and where the third threshold area is a higher threshold area (e.g., of a total surface area of the lens 118 or window). For example, if the revised mask area is less than (or less than or equal to) the first threshold area, the data processor 604, the controller 603, or the diagnostic module 610 can generate a first alert data message (e.g., message with green visual representation for user interface 611) for step S134 that indicates a higher cleanliness rating indicator of the lens 118 or window in which no cleaning of the lens 118 or window is required or recommended for a current sampling interval. If the revised mask area is greater than the first threshold area and less than (or less than or equal to) the second threshold area, the data processor 604, the controller 603, or the diagnostic module 610 can generate a second alert data message (e.g., message with yellow visual representation for user interface 611) for step S134 that indicates a medium cleanliness rating indicator of the lens 118 or window in which cleaning of the lens 118 or window is suggested or cautioned, but not essential for proper performance of the imaging system 11 and analysis by the controller 603, for a current sampling interval. If the revised mask area is greater than (or greater than or equal to) the third threshold area, the data processor 604, the controller 603, or the diagnostic module 610 can generate a third alert data message (e.g., message with a red visual representation for user interface 611) for step S134 that indicates a low cleanliness rating indicator of the lens 118 or window in which cleaning of the lens 118 or window is recommended or essential for proper performance of the imaging system 11 and analysis by the controller 603, for a current sampling interval.

In step S134, the data processor 604, the controller 603 or the diagnostic module 610 alerts an end user to inspect or clean lens 118 or window of the imaging device 116 or the passage 104. For example, the data processor 604, the controller 603 or the end user sends an alert message to the user interface 611 that informs or warns the end user to inspect or clean the lens 118 or window of the imaging device 116 or the passage 104. The lens 118 may be smudged with dirt, debris or the passage 104 may have foreign matter, or even agricultural material that is stuck in the passage 104 or on the lens 118 or window.

In one example of step S134, the data processor 604, the controller 603 or the diagnostic module 610 sends the first alert data message, the second alert data message or the third alert data message for display of a visual representation to the operator on the user interface 611 for action. For example, each first alert data message, second alert data message and third alert data message corresponds to a respective percentage or percentage range of lens cleanliness of a percent area basis of the lens 118 or window.

In step S132, the data processor 604, controller 603 or the diagnostic module 610 waits for a time interval and then returns to step S100 for another iteration of the method with a next set of collected images, which may require purging, deleting, clearing or resetting the buffer memory or allocated data storage of the data storage device 607.

Figure 9:
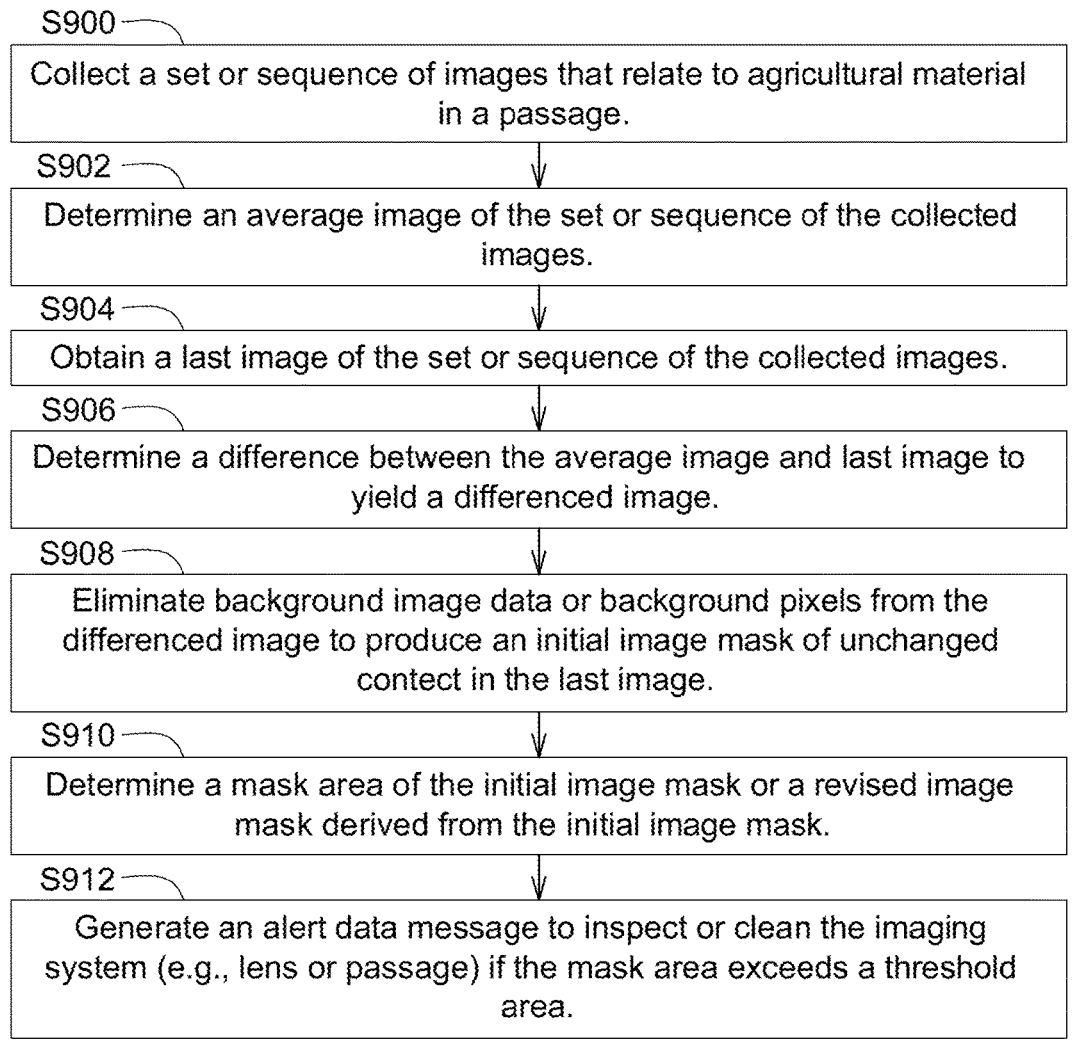
FIG. 9 is a flow chart of another embodiment of a method for evaluating performance of an imaging system.

FIG. 9 illustrates a method for evaluating the performance of an imaging system 11 for inspection or observation of the attributes or characteristics of an agricultural material (e.g., harvested crop). The method of FIG. 9 begins in step S900.

In step S900, a controller 603, a data processor 604 or a diagnostic module 610 collects a set or sequence of images that relate to agricultural material in a passage 104, such as a passage 104 of a combine or harvesting machine 100. Step S900 may be conducted in accordance with various techniques that may be performed separately or cumulatively. Under a first technique for performing S900, the controller 603, a data processor 604, or the diagnostic module 610 receives the set or sequence of images from an imaging device 116 or camera that has a field of view directed toward an opening in the passage 104. Under a second technique for S900, a controller 603, a data processor 604 or a diagnostic module 610 collects a set or sequence of images that relate to the agricultural material by storing the one or more images in buffer memory or in allocated data storage of a data storage device 607.

In step S902, a controller 603, a data processor 604 or a diagnostic module 610 determines an average image of the set or the sequence of the collected images. In one example, the controller 603, the data processor 604 or the diagnostic module 610 determines the average image over a time period (e.g., commensurate with the allocated data storage size for storing the set or sequence of images) that comprises a mean, median, or mode of corresponding pixels in the same respective positions (e.g., same row and column of the image, or same matrix position) in successive collected images to facilitate identification of unchanged content or stationary content in the one or more images. In another example, a data processor 604 determines whether the buffer memory or allocated data storage (e.g., of a predetermined size) is full to trigger the determination of the average image of the collected images.

Step S902 is actually the first of several steps (S902, S904, S906, and S908) that are collectively used to identify unchanged or stationary content in the image data. In general, the process of identifying the unchanged or stationary content in the image data requires the controller 603, data processor 604 or diagnostic module 610 to determine the average image over a time period and to eliminate background image data, where the unchanged content or stationary content indicates agricultural material or foreign material that is stuck to a window or lens 118 of the imaging system 11, or foreign material or agricultural material that is blocking or clogging a passage 104 in a harvesting machine 100 associated with the imaging system 11.

In step S904, a controller 603, data processor 604, or a diagnostic module 610 obtains a last image of the set or sequence of the collected images.

In step S906, a controller 603, data processor 604, or a diagnostic module 610 determines a difference between the average image and last image to yield a differenced image.

In step S908, a controller 603, data processor 604, or a diagnostic module 610 eliminates background image data or background pixels from the differenced image to produce an initial image mask of unchanged content in the last image. To eliminate background image data or background pixels from the differenced image, the controller 603, data processor 604 or diagnostic module 610 may apply color differentiation to identify and eliminate background pixels of predetermined color or hue that are associated with an interior 106 or passage 104 for conveying the agricultural material that is observed by the imaging system 11.

In step S910, the controller 603, data processor 604, or diagnostic module 610 determines a mask area of the initial image mask or a revised image mask derived from the initial image mask.

In step S912, the controller 603, data processor 604, or diagnostic module 610 generates an alert data message to inspect or clean the imaging system 11 if the mask area exceeds a threshold area.

Figure 10:
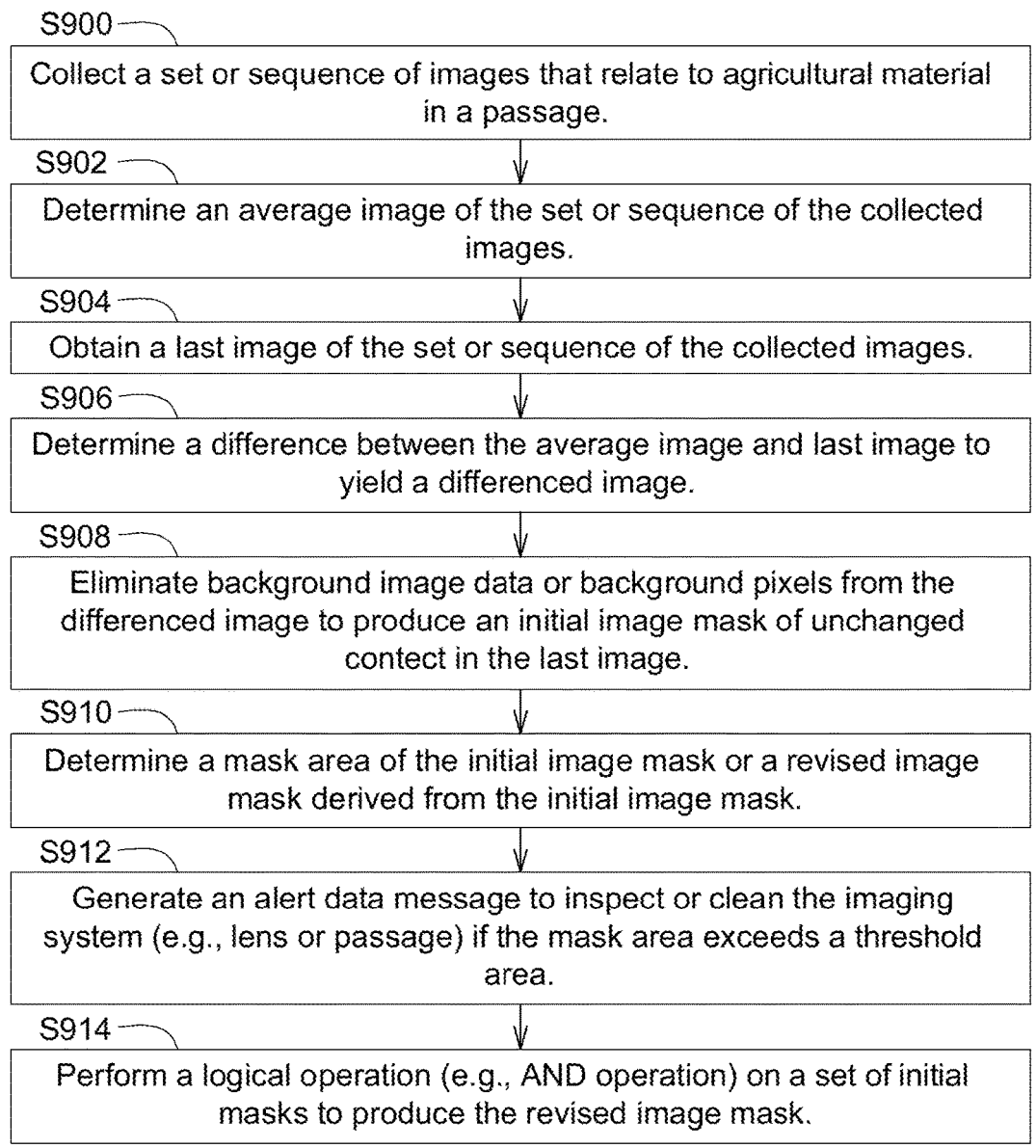
FIG. 10 is a flow chart of yet another embodiment of a method for evaluating performance of an imaging system.

The method of FIG. 10 is similar to the method of FIG. 9 except the method of FIG. 10 further includes step S914. Like reference numbers in FIG. 9 and FIG. 10 indicate like steps or procedures.

In step S914, the controller 603, data processor 604, or diagnostic module 610 performs a logical operation on a set of initial image masks (e.g., or a sequence of initial image masks) to produce a revised image mask. For example, the logical operation comprises applying an AND operation (logical conjunction), or its equivalent (e.g. NAND and inversion), to a set or sequence of initial image masks to produce the revised image mask.

Figure 11:
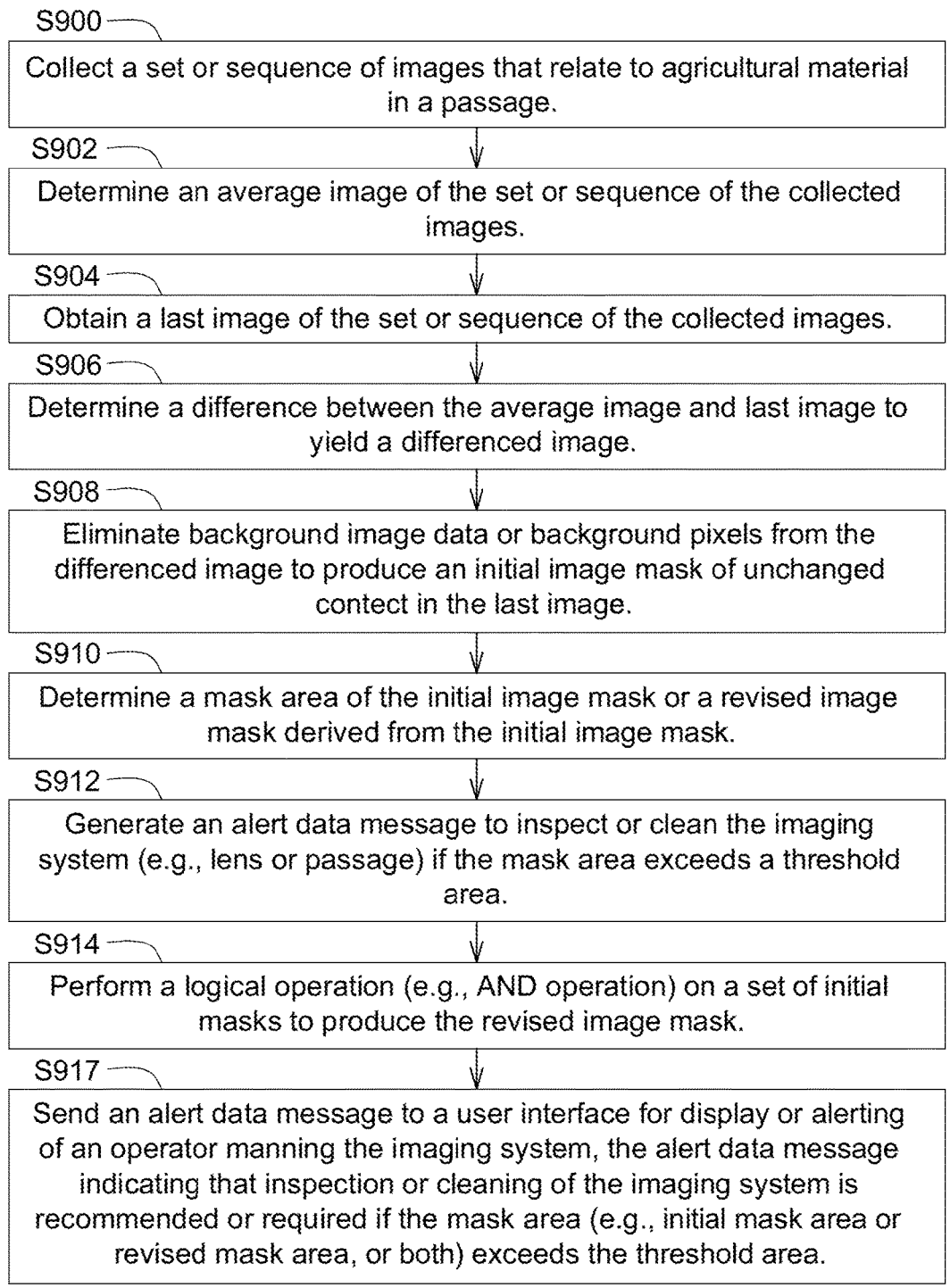
FIG. 11 is a flow chart of still another embodiment of a method for evaluating performance of an imaging system.

The method of FIG. 11 is similar to the method of FIG. 10 except the method of FIG. 11 further includes step S917. Like reference numbers in FIG. 10 and FIG. 11 indicate like steps or procedures.

In step S917, the controller 603, data processor 604 or diagnostic module 610 sends an alert data message to a user interface for display or alerting of an operator manning the imaging system 11. The alter data message indicates that inspect or cleaning of the imaging system 11 is recommended or required if the mask area (e.g., initial mask area, revised mask area, or both) exceeds the threshold area.

Having described the preferred embodiment, it will become apparent that various modifications can be made without departing from the scope of the invention as defined in the accompanying claims.

What is claimed is:

1. A method for evaluating performance of an imaging system, the method comprising:
    collecting a set of images that relate to agricultural material in a passage;
    determining an average image of the set of collected images;
    identifying a last image in the set of collected images;
    determining a difference between the average image and the last image to yield a differenced image containing candidate pixels;
    eliminating background image data from the differenced image to produce an initial image mask of unchanged content in the last image;
    determining a mask area of the initial image mask; and
    generating an alert data message to inspect the imaging system if the mask area exceeds a threshold area.

2. The method according to claim 1 wherein collecting the set of images comprises:
    collecting a plurality of images that relate to the agricultural material, and
    storing the plurality of images in a data storage device.

3. The method according to claim 1 further comprising:
    performing a logical operation on a set of initial image masks to produce a revised image mask.

4. The method according to claim 3 wherein performing the logical operation comprises applying a logical conjunction operation to the set of initial image masks.

5. The method according to claim 1 wherein eliminating background image data from the differenced image comprises applying color differentiation to identify and eliminate background pixels of color or hue that are associated with an interior of the passage that is observable by the imaging system.

6. The method according to claim 1 wherein determining the average image comprises determining a mean, median, or mode corresponding to individual pixels occupying a same position in successive images in the set of images to facilitate identification of unchanged content in the set of images.

7. The method according to claim 6 wherein the unchanged content is identified by determining of the average image and eliminating background image data, wherein the unchanged content is indicative of agricultural material or foreign material that is stuck to a window or lens of the imaging system, or foreign material or agricultural material that is blocking or clogging the passage associated with the imaging system.

8. The method according to claim 1 further comprising:
sending an alert data message to a user interface, wherein the alert data message prompts a user to inspect the imaging system.

9. The method according to claim 3 wherein determining a mask area comprises determining a mask area of the revised image mask.

10. A system for evaluating performance of an imaging system, the system comprising:
an imaging device for collecting a set of images that relate to agricultural material in a passage;
a controller coupled to the imaging device, the controller comprising:
a data port for receiving the set of images from the imaging device,
a diagnostic module comprising instructions stored on a data storage device,
an electronic data processor arranged to execute the instructions associated with the diagnostic module,
wherein execution of the diagnostic module causes the controller to perform a method comprising:
determining an average image of the set of images;
obtaining a last image of the set of images;
determining a difference between the average image and the last image to create a differenced image containing candidate pixels;
eliminating background image data from the differenced image to produce an initial image mask of unchanged content identified in the last image;
determining a mask area of the initial image mask; and
generating an alert data message to inspect the imaging system if the mask area exceeds a threshold area.

11. The system according to claim 10, wherein the data storage device comprises:
a buffer memory for storing the set of images, wherein the electronic data processor executes the instructions associated with the diagnostic module when the buffer memory is full.

12. The system according to claim 10, wherein the diagnostic module further comprises instructions that cause the data processor to perform a logical operation on a set of initial image masks to produce a revised image mask.

13. The system according to claim 12 wherein the logical operation comprises applying a logical conjunction operation to the set of initial image masks to produce the revised image mask.

14. The system according to claim 10, wherein the diagnostic module further comprises instructions that cause the data processor, when eliminating the background image data, to apply color differentiation to identify and eliminate the background pixels of color or hue that are associated with an interior of the passage that is observable by the imaging system.

15. The system according to claim 10, wherein the diagnostic module further comprises instructions that cause the data processor, when determining the average image, to determine a mean, median, or mode corresponding to individual pixels occupying a same position in successive images in the set of images to facilitate identification of unchanged content in the set of images.

16. The system according to claim 15 wherein the diagnostic module further comprises instructions that cause the data processor to identify the unchanged content, wherein the unchanged content is indicative of agricultural material or foreign material that is stuck to a window or lens of the imaging system, or foreign material or agricultural material that is blocking or clogging the passage in a harvesting machine associated with the imaging system.

17. The system according to claim 10, wherein the diagnostic module further comprises instructions that cause the data processor to send the alert data message to a user interface.

* * * * *